Sept. 29, 1931.  O. I. CHORMANN ET AL  1,825,443
LIQUID TREATING APPARATUS
Filed June 14, 1928   13 Sheets-Sheet 12
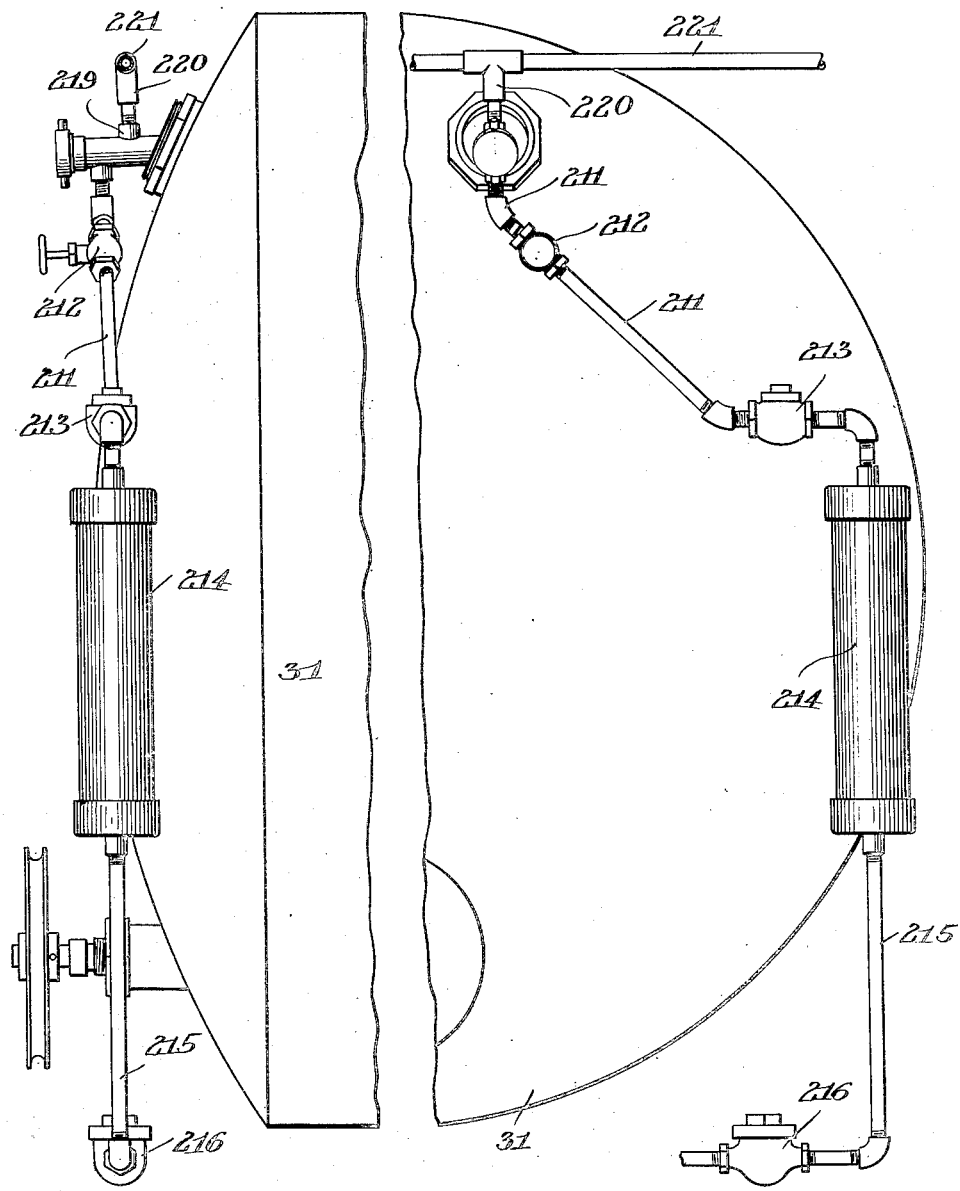
INVENTORS
Otto I. Chormann
Jens N. Jacobsen
BY Crumpston & Griffith
their ATTORNEYS Sept. 29, 1931. O. I. CHORMANN ET AL 1,825,443
LIQUID TREATING APPARATUS
Filed June 14, 1928 13 Sheets-Sheet 13
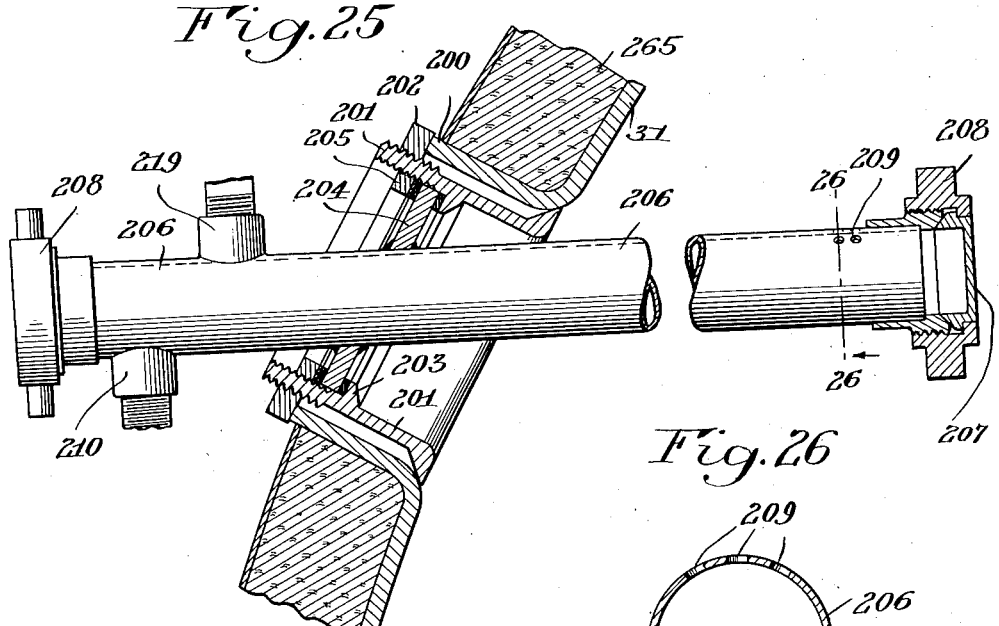
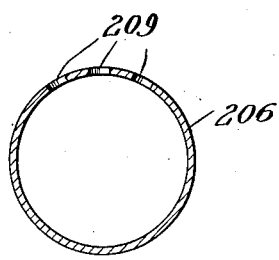
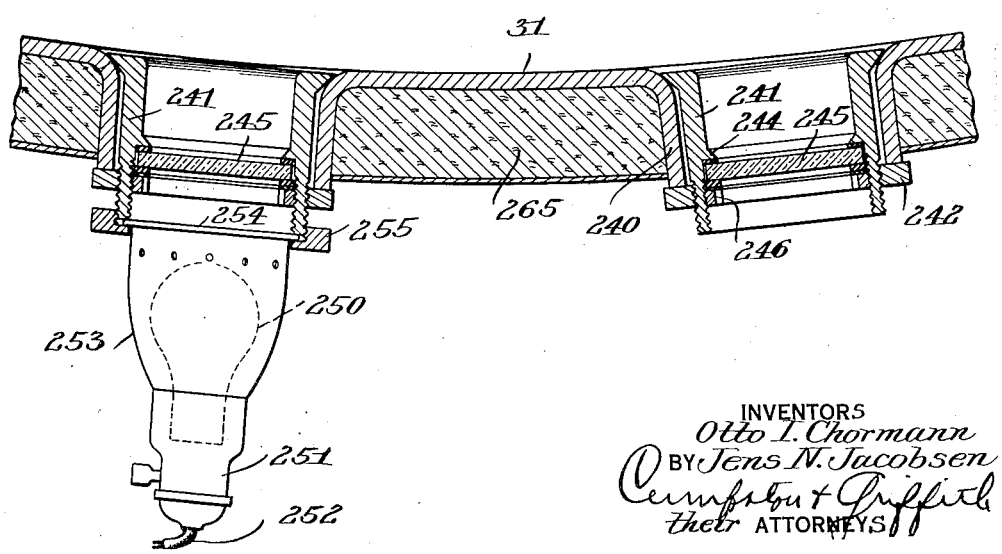
INVENTORS
Otto I. Chormann
Jens N. Jacobsen
BY Cumpston + Griffith
their ATTORNEYS Patented Sept. 29, 1931

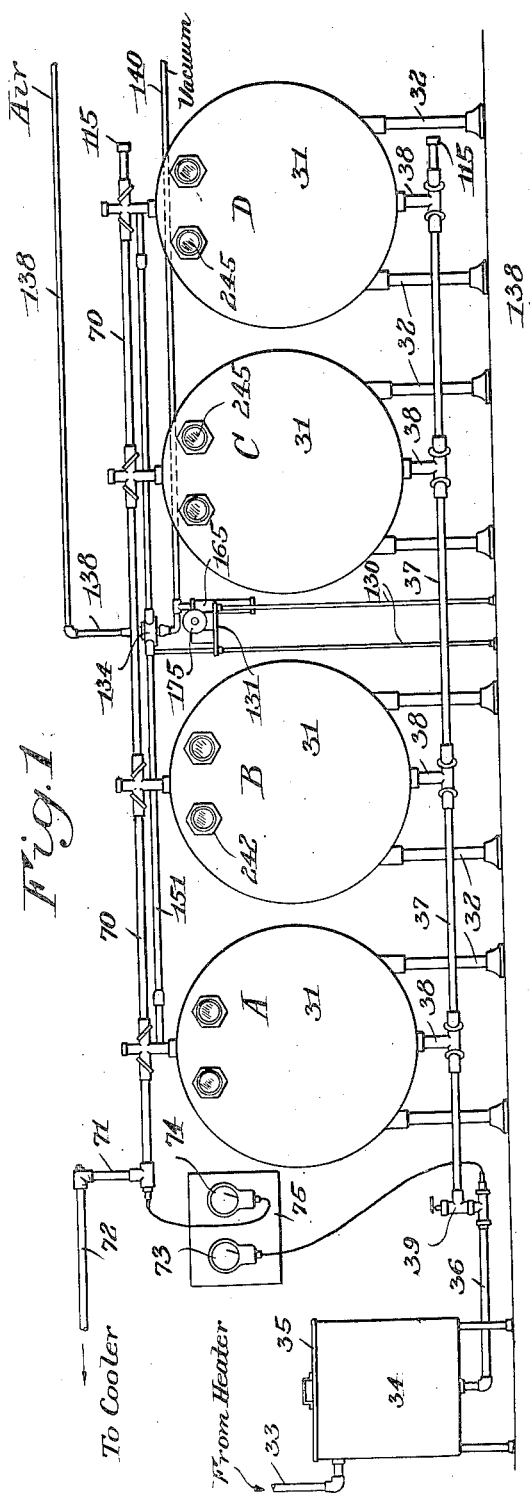

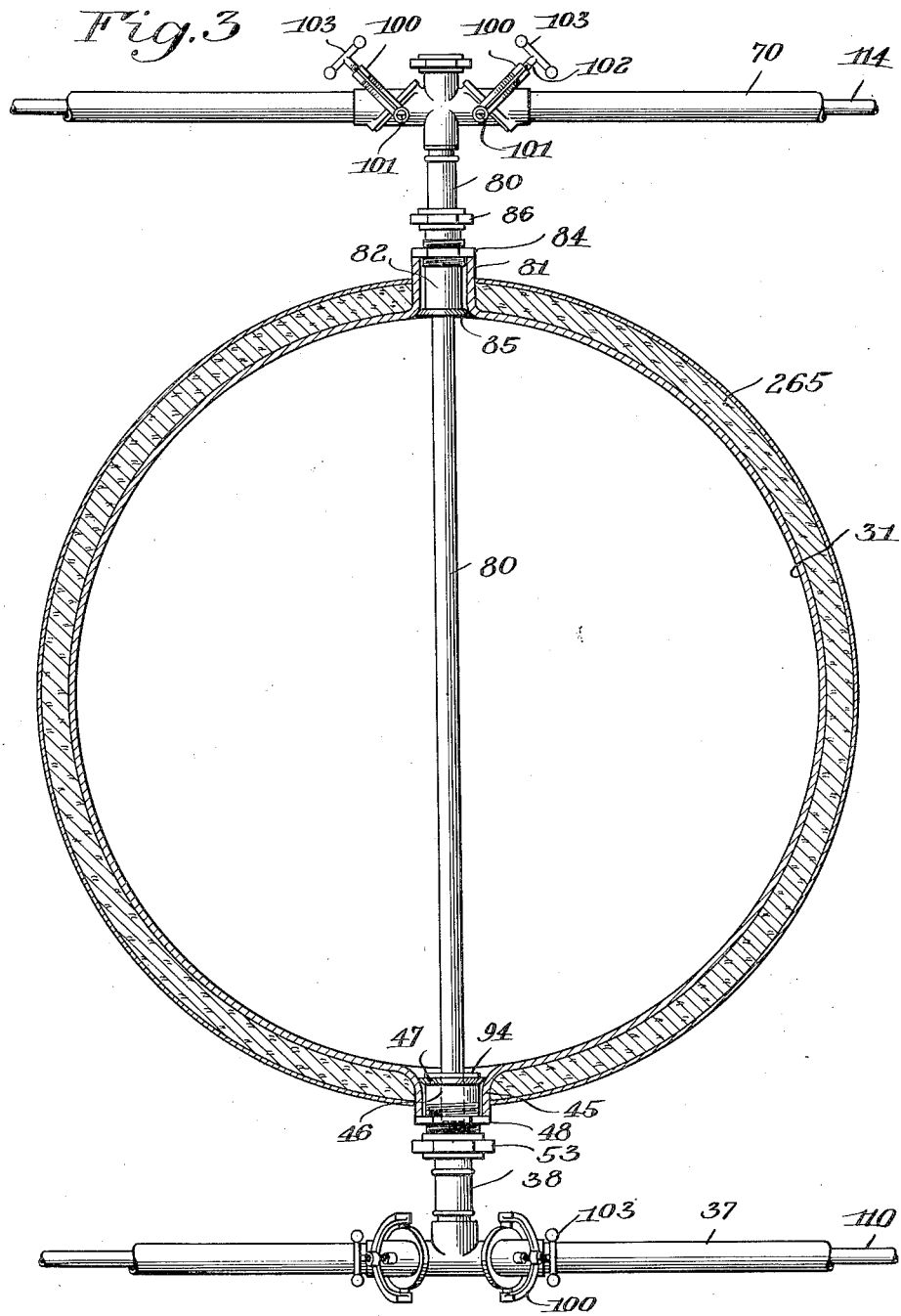

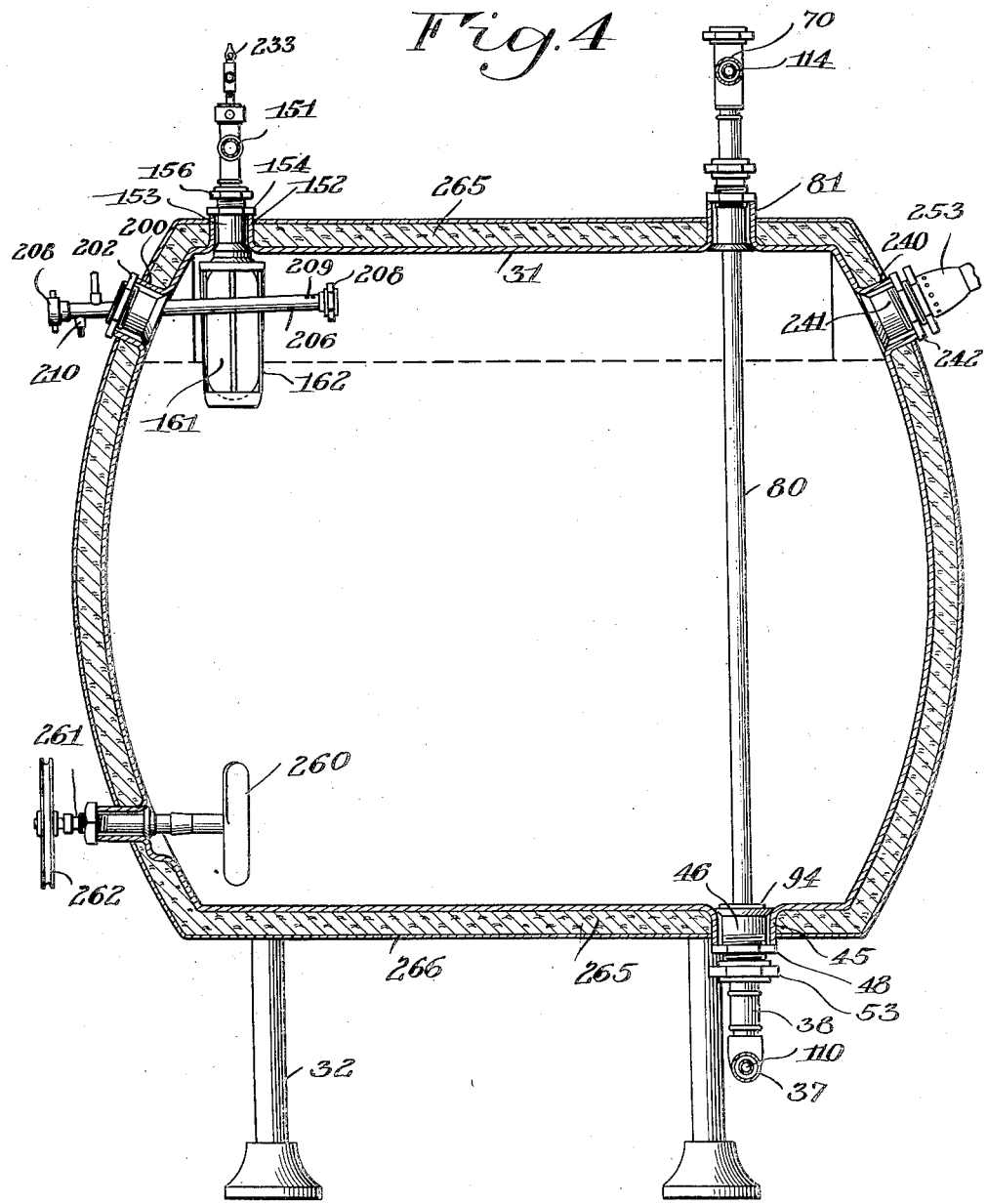

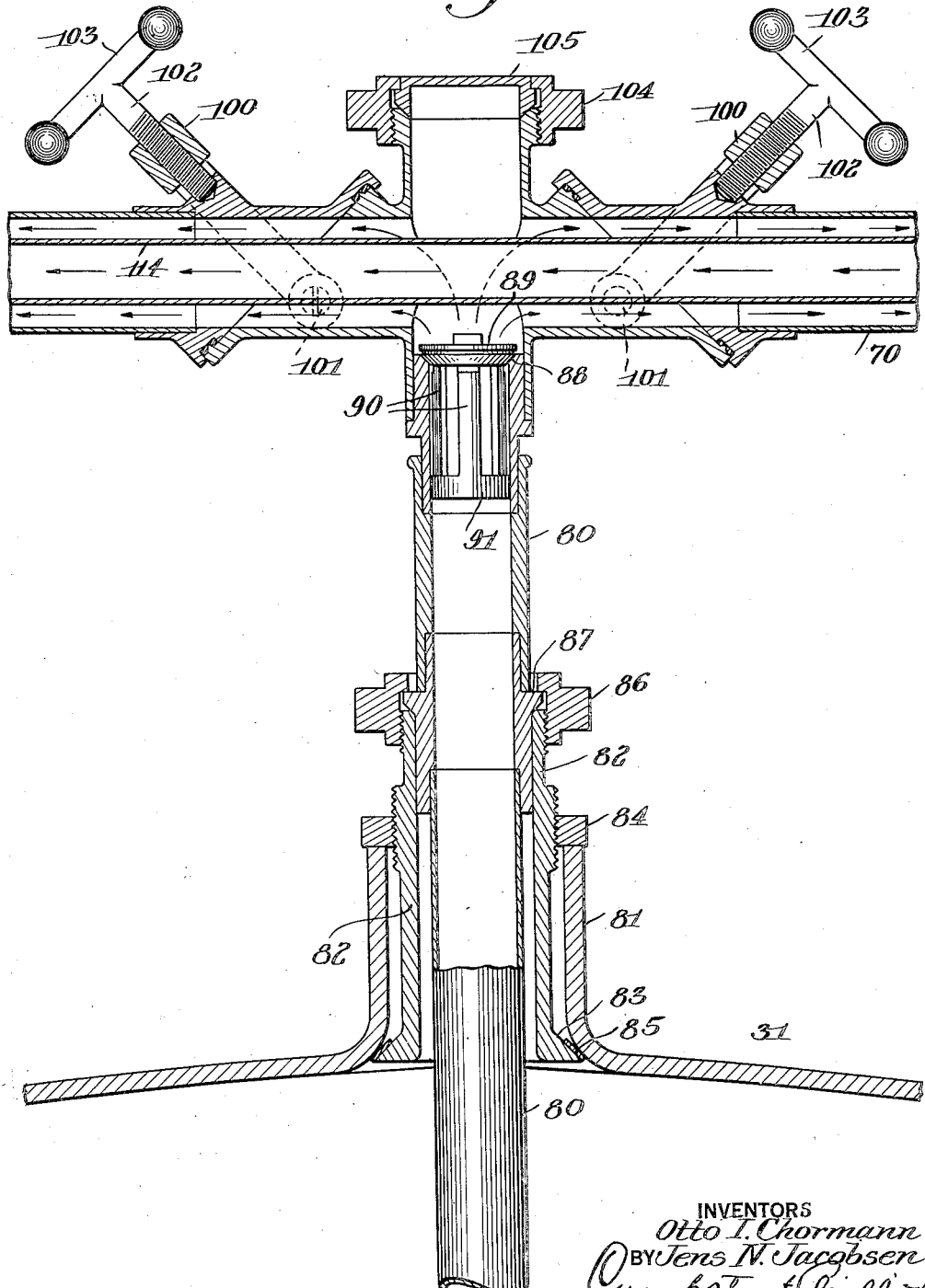

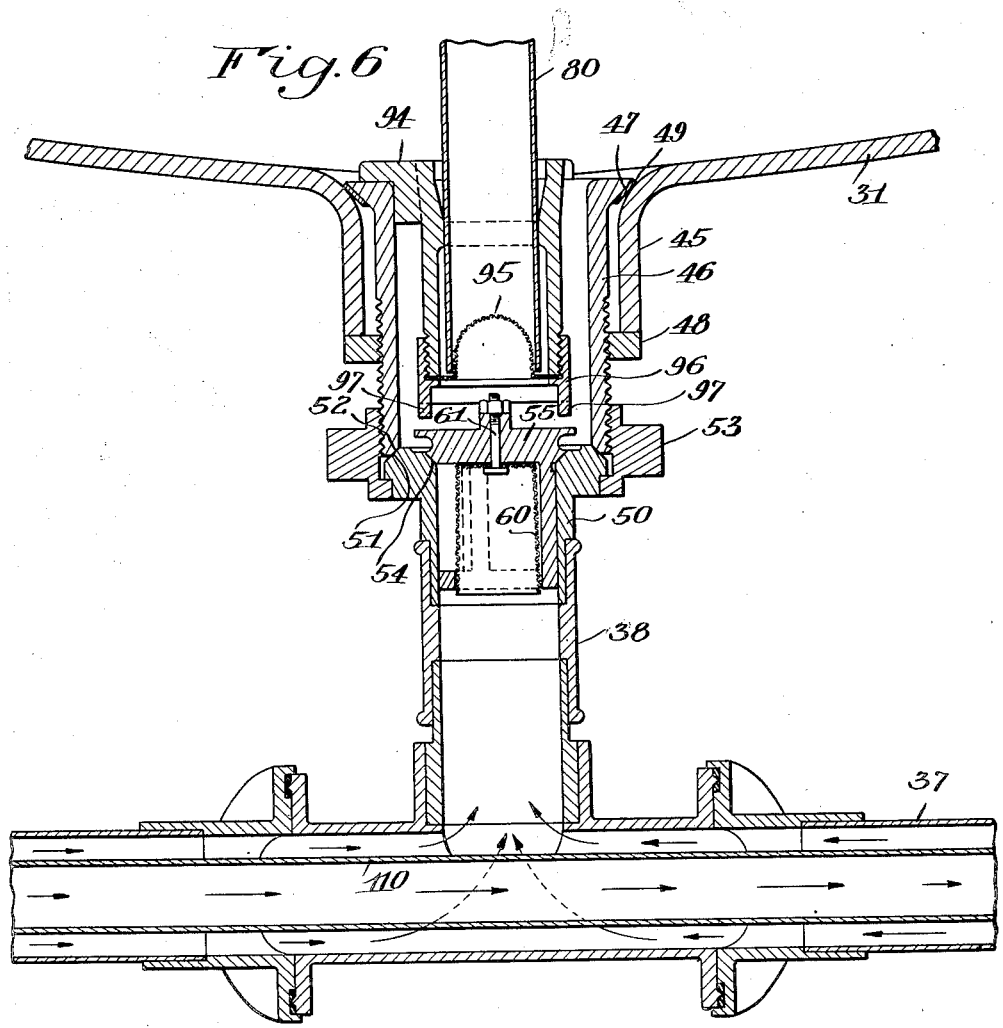
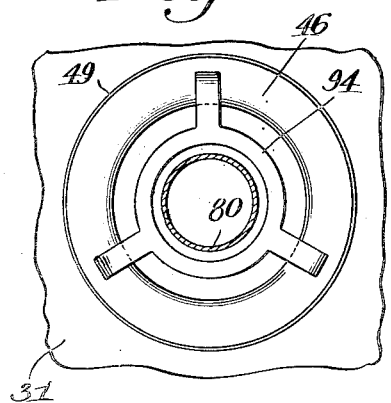
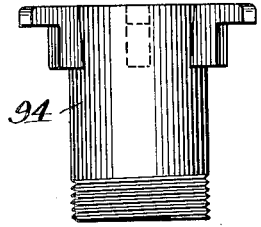
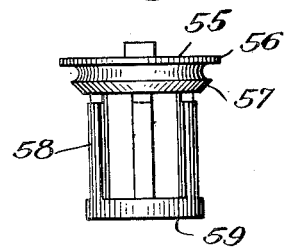

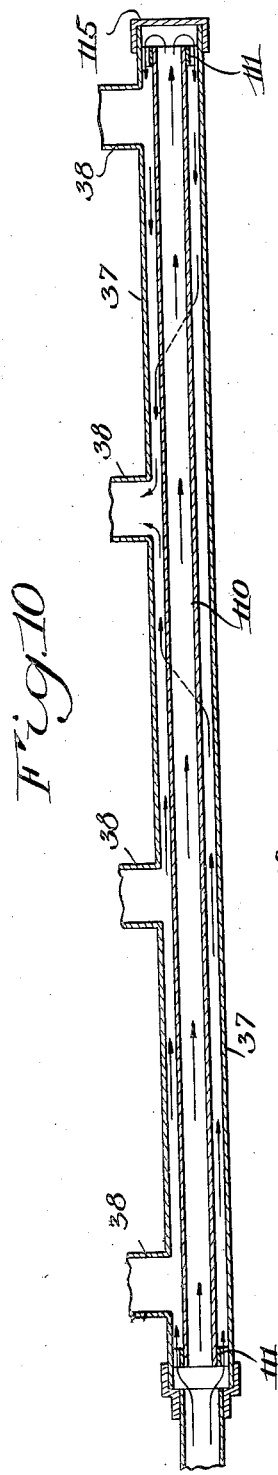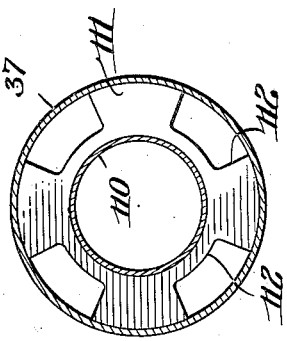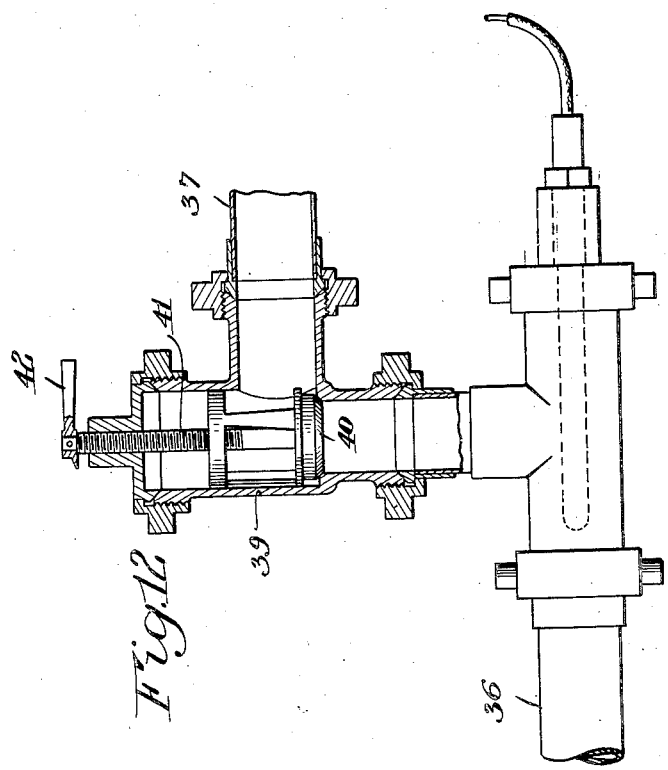

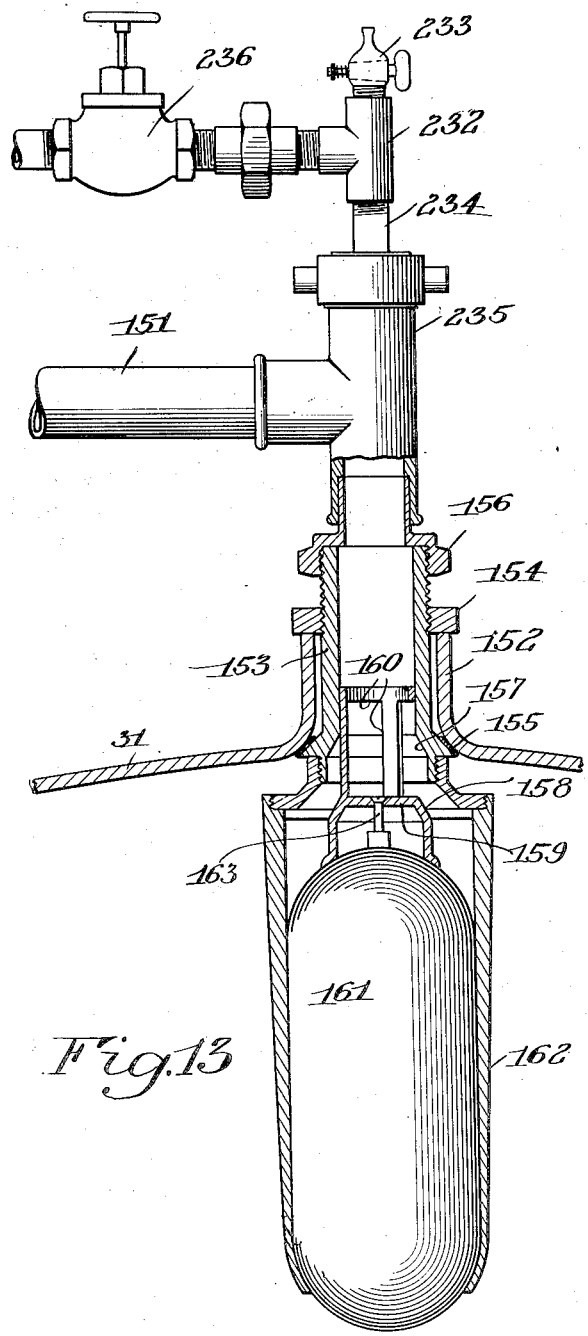
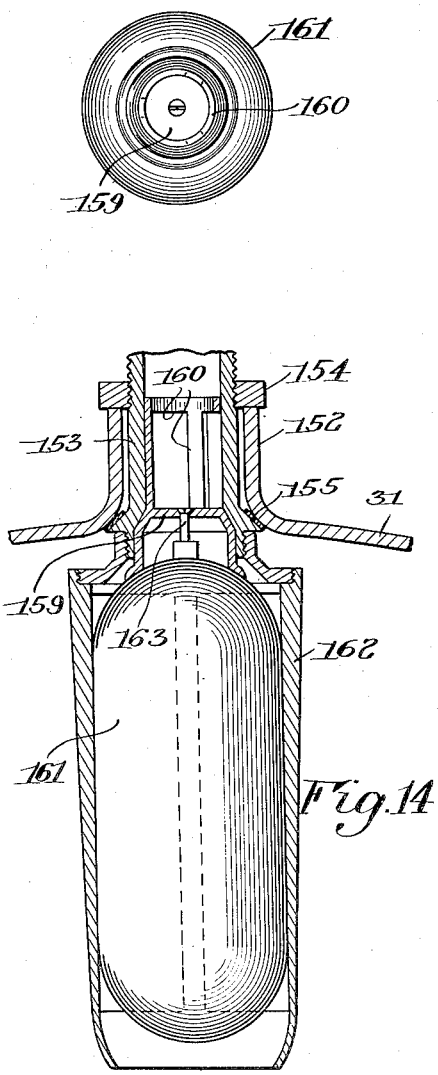
Fig. 15
Fig. 13
Fig. 14

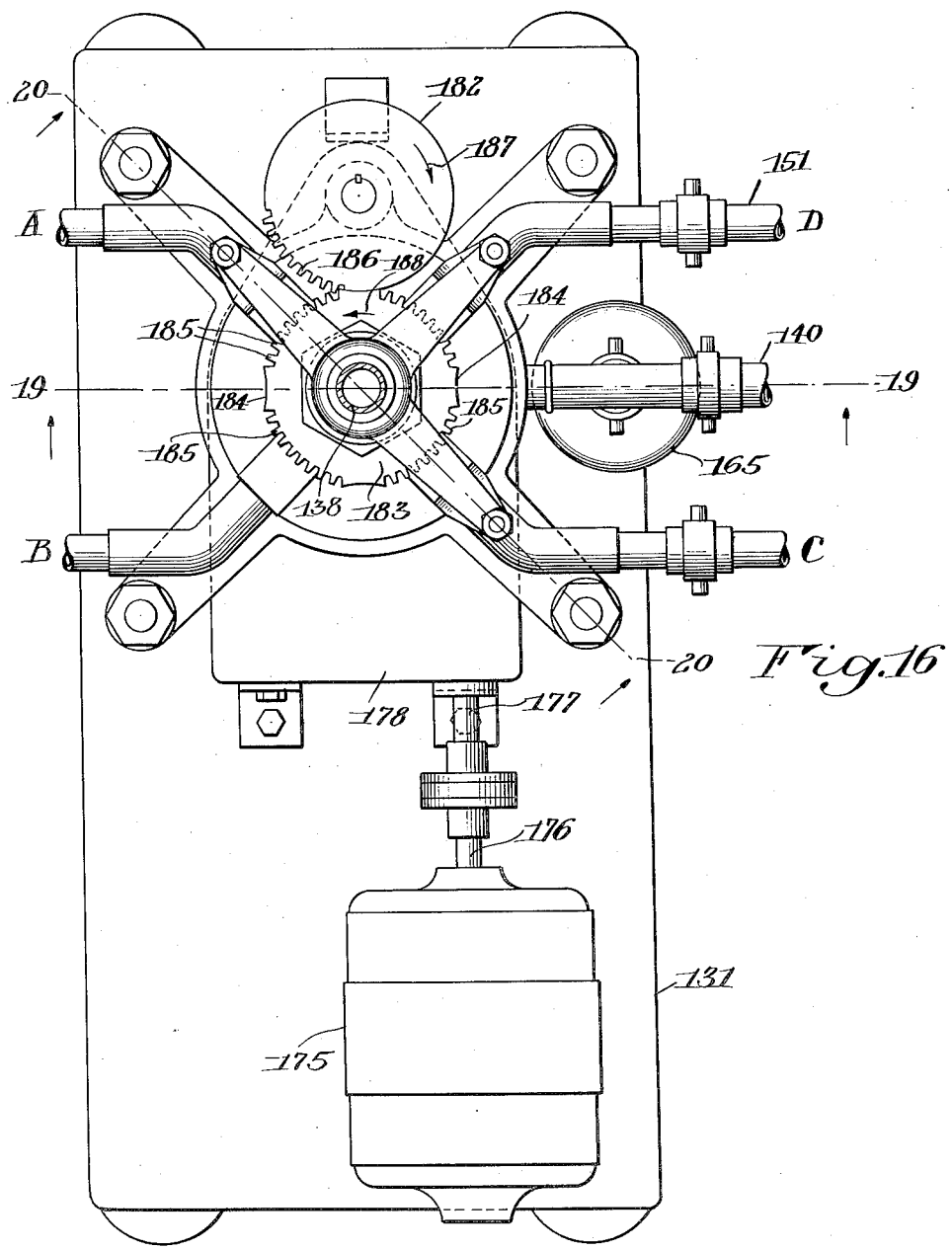

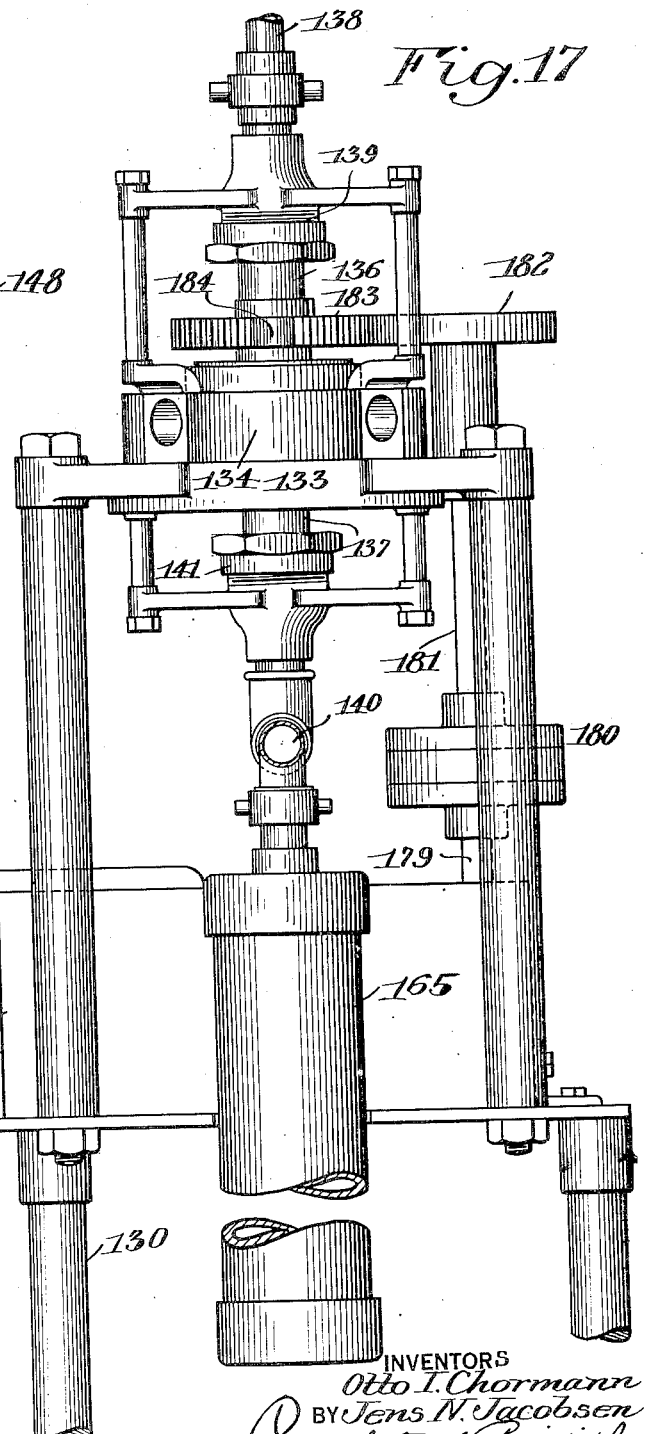

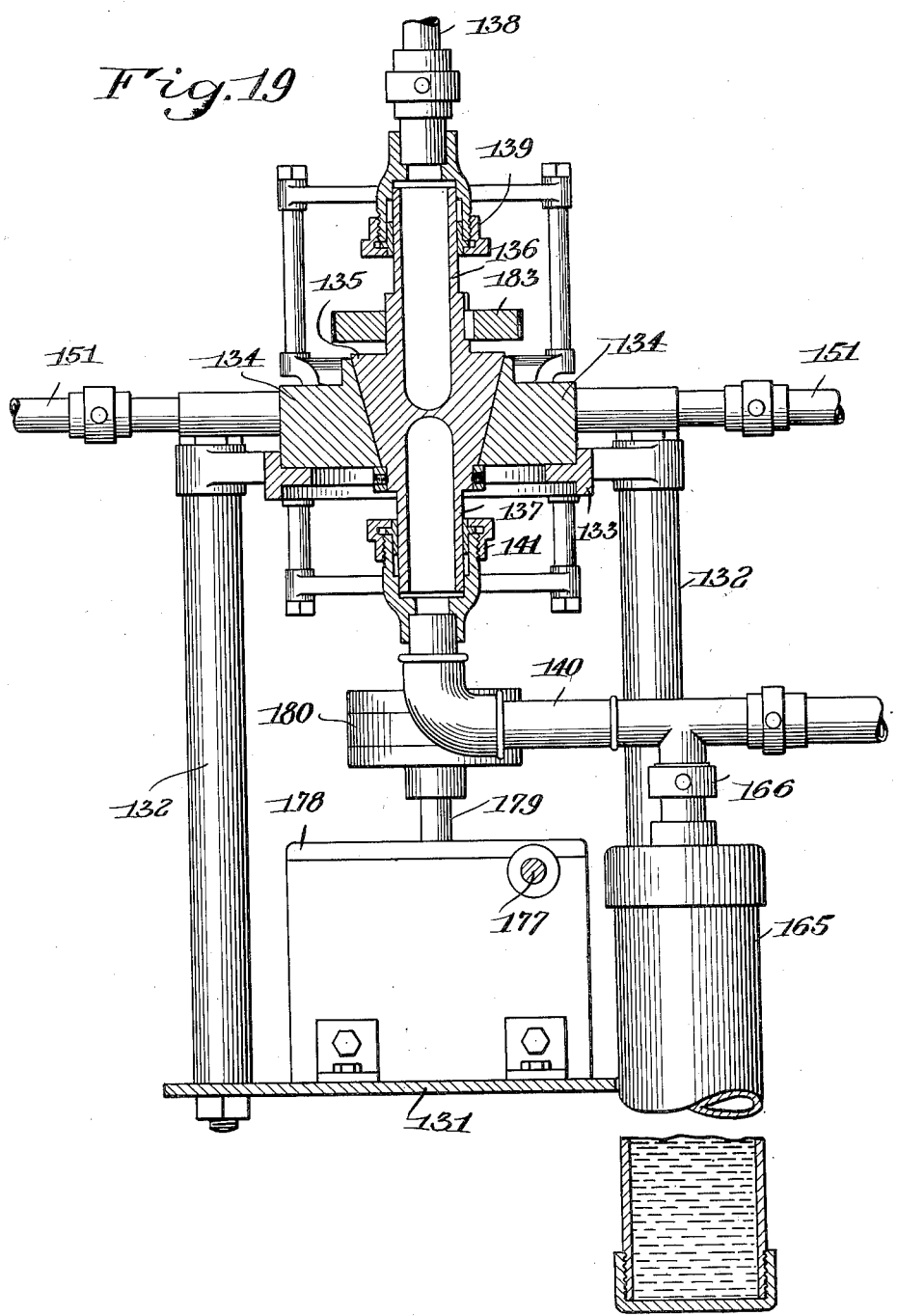

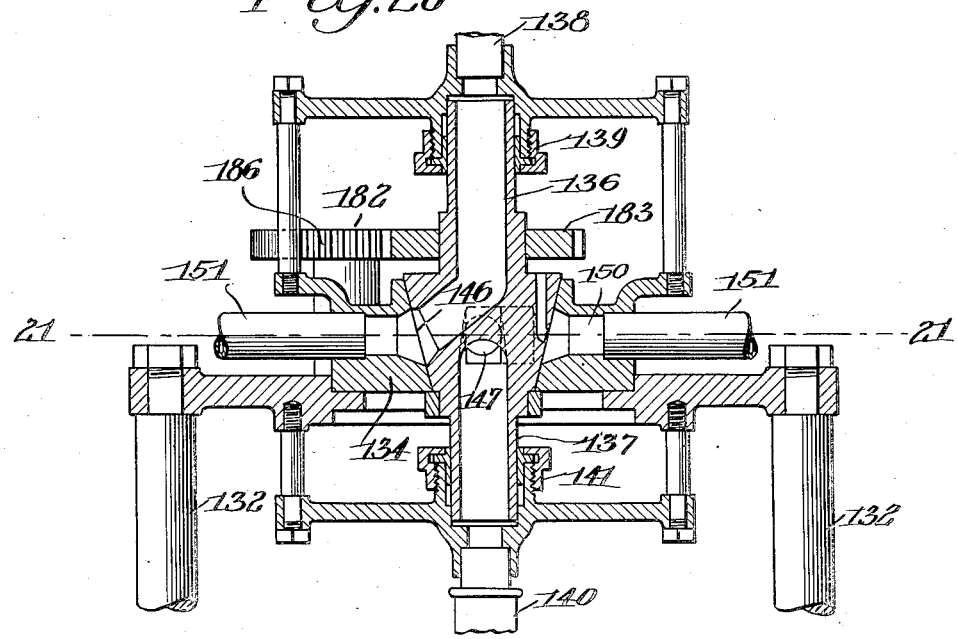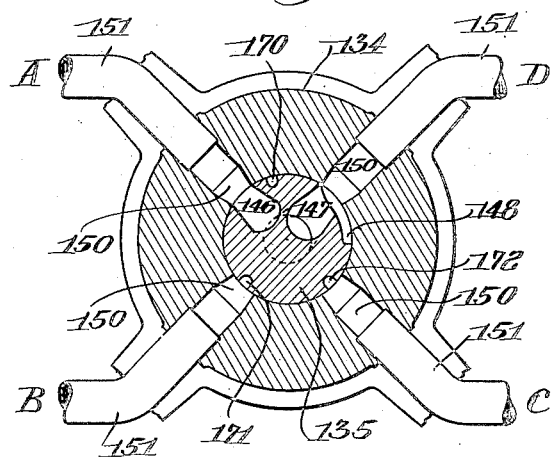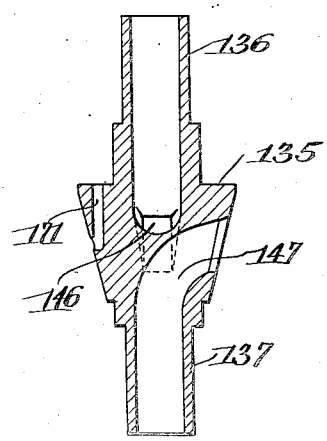

1,825,443

UNITED STATES PATENT OFFICE

OTTO I. CHORMANN, OF ROCHESTER, NEW YORK, AND JENS N. JACOBSEN, OF ALAMEDA, CALIFORNIA, ASSIGNORS TO THE PFAUDLER CO., OF ROCHESTER, NEW YORK, A CORPORATION OF NEW YORK

LIQUID TREATING APPARATUS

Application filed June 14, 1928. Serial No. 285,409.

This invention relates to an apparatus for treating liquids, and especially to one designed for use in connection with the process known as milk pasteurizing. The principal object of the invention is the provision of a generally improved, more satisfactory, and more efficient apparatus for effecting various treatments of liquids.

Another object of the invention is the provision of an apparatus which may be kept easily in a clean and sanitary condition, and in which various parts are easily and quickly detachable for the purpose of cleaning, sterilization and inspection.

It is still a further object of the invention to provide means for conducting liquid to and from the tanks or holders so arranged that no pockets or dead ends are formed in such conducting means.

An additional object of the invention is the provision of improved means for filling and emptying the liquid tanks, and especially the provision of an improved control valve and valve operating mechanism in connection with the filling and emptying means.

Still another object is the provision of means for preheating the tanks before the liquid to be treated is placed therein, and also the provision of means for heating the space in the tanks above the level of the liquid therein, during the carrying on of the process.

It is an additional object of the invention to provide means for preventing foreign matter from interfering with the proper closing of the check valves used with this apparatus, such means including screen members for straining foreign matter from the liquid passing through the check valve. Other objects of the invention will be readily apparent from the following description and claims.

To these and other ends the invention resides in certain improvements and combinations of parts, all as will be hereinafter more fully described, the novel features being pointed out in the claims at the end of the specification.

In the drawings:

Fig. 1 is a side elevation of an apparatus showing one embodiment of the invention;

Fig. 2 is a plan view thereof;

Fig. 3 is a transverse vertical section through one of the liquid holding tanks;

Fig. 4 is a longitudinal vertical section through one of the tanks;

Fig. 5 is a vertical section taken through the upper portion of one of the tanks and the conduits connected thereto;

Fig. 6 is a vertical section through the lower portion of one of the tanks and the conduits connected thereto;

Fig. 7 is a top plan view of a portion of the bottom of a tank, showing a spacing and centering member therein;

Fig. 8 is a side elevation of the spacing and centering member;

Fig. 9 is a side elevation of a check valve member;

Fig. 10 is a longitudinal vertical section through one of the conduits connected to the tanks, illustrating the means for preventing dead ends or pockets therein;

Fig. 11 is a transverse section through the conduit shown in Fig. 10, illustrating details;

Fig. 12 is an elevation, partly in section, of a portion of the conduit for supplying liquid to the tanks, showing details of a regulating valve therein;

Fig. 13 is a view partly in elevation and partly in vertical section through the top of one of the tanks, showing a part of the connection for filling and emptying the tank by vacuum or pressure, and the float valve associated therewith in its open position, and showing also a portion of the connection for preheating the tank;

Fig. 14 is a view corresponding to a portion of Fig. 13, showing the float valve in closed position;

Fig. 15 is a plan view of the float valve removed from its valve seat;

Fig. 16 is a plan view of the control valve for emptying and filling the tanks, and of parts associated therewith;

Fig. 17 is a side elevation of the same;

Fig. 18 is a plan view of the valve plug;

Fig. 19 is a vertical section through the control valve mechanism taken substantially on the line 19—19 of Fig. 16;

Fig. 20 is a vertical section through the control valve mechanism taken substantially on the line 20—20 of Fig. 16;

Fig. 21 is a horizontal section through the valve mechanism taken substantially on the line 21—21 of Fig. 20;

Fig. 22 is a vertical section through the valve plug removed from the valve casing;

Fig. 23 is a fragmentary side elevation of one of the tanks showing part of the mechanism for heating the space above the level of the liquid within the tank;

Fig. 24 is a fragmentary end elevation of one of the tanks showing the same parts illustrated in Fig. 23;

Fig. 25 is a vertical section through a fragment of one of the tanks illustrating details of the mechanism for heating the space above the liquid;

Fig. 26 is a vertical section on the line 26—26 of Fig. 25, and

Fig. 27 is a horizontal section through a fragment of one of the tanks illustrating the construction of the peep holes or observation windows.

Similar reference numerals throughout the several views indicate the same parts.

A preferred embodiment of the invention is here disclosed with particular reference to a milk pasteurizer holding apparatus, but it should be clearly understood that such an apparatus is used for purposes of illustration only, and the invention is not limited to milk pasteurizer holding apparatus but is applicable equally well to many different forms of apparatus for treating various liquids by various processes.

As is well understood in the art, one of the known methods of pasteurizing milk comprises heating the milk in a suitable heater to proper pasteurizing temperature, introducing the heated milk into an insulated tank or other suitable receptacle and holding it therein for the required holding interval (usually about thirty minutes), and then withdrawing the milk from the tank and cooling it to the desired temperature. It is an apparatus for carrying out this method of pasteurization that is here illustrated by way of example. This apparatus is especially adapted to be operated according to the so-called "continuous" method, in which one or more tanks or receptacles are being filled while another tank or tanks are emptied and while still another tank or tanks are filled or partially filled with milk which is being held for the required interval.

Referring now to the drawings, Figs. 1 and 2 illustrate the general features of the apparatus. A plurality of tanks 31 (four being shown) are suitably supported on members 32. A conduit 33 leads from a milk heater (not shown) to the small reservoir or surge tank 34 having a lid 35 which is removable so that the tank may be inspected and cleaned. From the bottom of the tank 34 there is a conduit 36 leading to a conduit 37 which extends horizontally under the tanks 31 and is connected by branches 38 to each of the tanks.

Interposed between the conduit 36 and the conduit 37 is a regulating valve within a casing 39, this valve being shown in detail in Fig. 12. The casing is provided with a valve seat, as illustrated, and a valve member 40, slidably arranged within the casing, cooperates with the seat to shut off the flow completely or to allow such flow as may be desired. A valve stem 41, moved by means of a handle 42, controls the position of the valve member 40 and limits the extent to which it may open under the influence of pressure on the under side of the member 40.

At the bottom of each of the tanks 31 is an outwardly extending annular flange 45, as illustrated in Fig. 6. A sleeve member 46 having a beveled seating surface 47 is positioned within the annular flange 45, as illustrated clearly in Fig. 6, and is drawn outwardly by a nut 48. A packing member 49 is thus compressed tightly between the seat 47 of the sleeve 46 and the rounded shoulder joining the annular flange 45 to the body of the tank 31, so that a liquid tight joint is formed. The branch 38 leading from the conduit 37 to the tank 31 includes at its top a member 50, this member having a beveled seat 51 adapted to cooperate with the beveled lower end 52 of the sleeve 46. A nut 53 screwed on to the threaded portion of the sleeve 46 holds these two beveled seats 51 and 52 in contact with each other and thus provides a liquid tight joint. Preferably, the nut 53 is of such size and the screw threads thereon of such a pitch that the nut may be screwed and unscrewed readily by hand, without the necessity of using a wrench.

A beveled check valve seat 54 is formed in the member 50, and a check valve member 55 is adapted to cooperate with this seat. The member 55 is shown in elevation in Fig. 9, and it will be observed that it carries a circumferential flange 56 spaced slightly above the portion 57 which is adapted to engage the valve seat, and having a diameter greater than that of this portion. This flange 56 is in the nature of a guard flange, and prevents damage to the carefully finished seat portion 57 in case the valve is dropped. The flange 56, being of greater diameter than the seat 57, would rest upon the floor and prevent the seat portion 57 from coming into contact with the floor so that it might be dented or injured.

A guiding portion is preferably formed on the bottom of the check valve member 55, this guiding portion consisting preferably of a cage-like structure comprising vertical members 58 spaced at intervals around the valve disk and connected to each other at their bottom ends by a ring 59. The position of the members 58 is such that they have a sliding fit within the member 50, and thus guide the valve disk 55 as it moves up and down.

From the foregoing description, it will be obvious that the check valve 55 will rise from its seat and open whenever the pressure of the fluid in the conduit 37 and branch 38 is greater than the pressure of the fluid within the tank 31, the guiding members 58 and 59 remaining within the conduit 38 when the valve is open and serving to guide the disk when it descends again. Whenever the fluid pressure within the tank 31 is greater than that within the conduit 37 and branch 38, this greater pressure will simply seat the valve disk more firmly, and escape of fluid from the tank into the conduit will be prevented.

It sometimes happens that during the cleaning of a conduit or other parts of milk pasteurizing apparatus, a bristle from a cleaning brush will become detached from the brush and lodge in the conduit, or other foreign matter will find its way thereinto. Later, as the milk or other fluid flows through the apparatus, the bristle or other foreign matter may stick on a valve seat and thus prevent complete closing of a valve.

In the present construction, therefore, a screen member 60 is associated with the check valve 55. This screen member might be of various forms, but in the embodiment shown it is somewhat cup-shaped and has a diameter slightly less than the inside diameter of the cage formed by the members 58 and 59. The screen is placed within this cage with its bottom uppermost, and is secured therein by means of a bolt 61 passing through the valve disk 55, as illustrated in Fig. 6. It will be readily apparent from this figure that any fluid passing upwardly through the branch 38 must pass through the screen 60 before reaching the check valve seat, and thus any bristles or other foreign matter will be effectively strained out of the fluid by this screen so that they cannot interfere with the proper closing of the check valve.

The conduit 37, branches 38, and check valves 55 comprise part of the means for supplying the tanks 31 with fluid. Preferably, the fluid is drawn into a selected tank or tanks by the creation of a partial vacuum therein, as will be explained hereafter. It is obvious, however, that many of the details of the conduit, check valves, and other parts, are applicable equally well to other systems than those which employ a vacuum, and it should be understood that the use of the disclosed construction in any other system or apparatus in which it might be advantageous is contemplated.

According to the present embodiment, the tanks are emptied through a conduit 70 which extends across the tanks slightly above them, as illustrated in Fig. 1. This conduit 70 is connected at one end to a short conduit 71 which in turn is connected to a conduit 72, which leads, in the present instance, to a cooler (not shown). It will be understood by those skilled in the art that the milk, previously heated to the required pasteurizing temperature, is conducted to the tanks 31 through the conduit 37 and branches 38; and after being held in the tanks for the required time, it is removed from them through the conduit 70 and conducted to a cooler where it is cooled to the required temperature. Recording thermometers 73 and 74 are preferably mounted on a convenient support 75, the thermometer 73 being connected to the conduit 36 and the thermometer 74 to the conduit 70, so that the former records the temperature of the milk as it enters the tanks and the latter shows the temperature as it leaves. Thus the operator in charge of the apparatus may see at once whether the process is operating satisfactorily.

The outlet conduit 70 is connected to each of the tanks 31 by a branch 80. An annular flange 81 is formed at the top of each of the tanks 31, this flange being similar to the flange 45 at the bottom of the tank. A sleeve 82 having a beveled seat 83 is mounted within the annular flange 81 and is held in place by a nut 84, which serves to compress the packing 85 between the seat 83 and the wall of the tank 31. This construction is, in general, similar to the construction of the inlet opening at the bottom of the tank, which has been described above.

The branch 80 extends downwardly from the conduit 70 through the sleeve 82 and is held in place by a nut 86 screwed on to the upper end of the sleeve 82 and cooperating with a flange 87 formed on one of the members of which the branch 80 is constructed.

At the top of the branch 80 there is formed a seat 88 for a check valve 89, this check valve having a guiding portion formed thereon consisting of vertical members 90 and a horizontal ring 91, similar to the members 58 and ring 59 on the check valve 55 above described. It will be obvious from Fig. 5 that this check valve 89 will open when the fluid pressure within the tank 31 is greater than that within the discharge conduit 70, and will be firmly seated and held closed whenever the pressure within the conduit 70 is greater than that within the tank 31.

The branch 80 which leads from the conduit 70 in through the top of the tank 31 does not terminate at the top of the tank, but extends down to the bottom thereof, as shown in Figs. 3 and 4. The lower end of the conduit 80 extends into the well formed by the sleeve 46, as illustrated in Fig. 6. A spider 94, shown in plan in Fig. 7 and in elevation in Fig. 8, is positioned within the sleeve 46 and has a central opening through which the branch 80 passes. Thus the lower end of the branch 80 is centered and held in proper alinement by the spider 94. A screen member 95 is clamped to the lower end of the spider by a member 96, this screen member being dished upwardly so that it extends partially into the open end of the branch 80, as shown in Fig. 6. This construction of the screen member allows adequate clearance for the upper end of the bolt 61 on the check valve 55 when the latter opens.

The lower end of the member 96 which clamps the screen 95 to the spider 94 is provided with a plurality of downwardly extending lugs 97 which serve to limit the upward motion of the check valve 55. Thus this check valve is prevented from opening more than a predetermined amount in response to the pressure within the branch 38. Furthermore, it should be noted that the discharge pipe 80 is in axial alinement with the inlet pipe or branch 38 and the check valve disk 55 is interposed between the open ends of these two pipes. When the check valve 55 moves upwardly to its open position to admit fluid from the pipe 38 into the tank 31, it also partially closes or tends to close the end of the pipe 80, and thus prevents the inrushing fluid from entering the end of this pipe and forces it to spread around this pipe and flow up into the tank through the annular space between the spider 94 and the sleeve 46.

When the pressure of the fluid within the tank 31 is greater than that within the inlet pipe or branch 38, the check valve 55 closes as has been mentioned above, and the fluid then flows down from the tank through the space between the spider 94 and the sleeve 46, enters the lower open end of the pipe 80 and flows upwardly through this pipe or branch, past the check valve 89 and into the discharge conduit 70. Preferably, the variations in pressure necessary to produce this inflow and discharge action are obtained through connecting the tanks alternately to pressure and vacuum lines, as will be described in detail hereinafter.

The inlet conduit 37 and the discharge conduit 70 are both constructed of sections connected to each other by quickly detachable joints, so that they may be easily dis- assembled by hand, without the aid of tools to be cleaned and sterilized as often as desired. One form of quickly detachable joint, illustrated by way of example, is shown in Fig. 5. It will be seen that the part of the conduit connected to each branch 80 is joined to the intermediate parts of the conduit between these branches, by means of an oblique joint formed at an angle of substantially 45 degrees. A bail 100 pivoted at 101 to one part of the conduit on one side of the joint carries a screw member 102 adapted to be screwed up by handle 103 against the other side of the joint in order to hold the parts tightly together. It is but the work of an instant to loosen the screw 102 and to swing the bail 100 over to one side, thus allowing the intermediate portions of the conduit 70 to be disconnected by a transverse movement. By unscrewing the nut 86, the outlet pipe or branch 80 may then be pulled up vertically out of the tank 31 carrying with it the short section of the conduit 70 to which the bails 100 are pivoted. Unscrewing of the nut 104, which is of such a size that it may be readily loosened by hand, will allow the removal of the cap 105, which will furnish an opening through which the check valve 89 may be removed for thorough cleaning and sterilization.

A construction similar to that above described is used for the inlet conduit 37, parts of the oblique detachable joints being shown in Fig. 6. In the case of the inlet conduit, however, it is not necessary to provide any opening corresponding to the one closed by the cap 105 in the outlet conduit. When the intermediate sections of the conduit 37 have been removed, unscrewing of the nut 53 will allow the inlet branch or pipe 38 to be removed from the tank 31, and as the check valve 55 is at the end of this pipe, it can be removed for cleaning and sterilization as soon as the pipe has been detachaed from the tank.

If the inlet conduit 37 and the outlet conduit 70 consisted simply of simple conduits with branches leading directly therefrom to the tanks, it is apparent that complete flow throughout the whole length of either conduit would be obtained only when the tank at the extreme end of the conduit was being emptied or filled. If the second tank from the left in Fig. 1, for example, were being filled, milk would flow only though the portion of the conduit 37 to the left of this tank, while the rest of the conduit extending to the right of this tank would form a sort of dead end or pocket in which no movement of fluid will take place. If, at the same time, the second tank from the right were being emptied, the fluid would flow through that portion of the conduit 70 which extends leftwardly from this tank, but there would be no flow through that part of the conduit 70 extending to the right of this tank. The existence of these dead ends in which the fluid is stagnant for a time is especially undesirable in milk pasteurizing apparatus or in apparatus for carrying out other processes in which either bacteria or chemical conditions must be controlled within narrow limits. Means has therefore been provided in the present apparatus for causing a flow throughout the entire length of the supply and discharge conduits, irrespective of which particular tank is being filled or emptied.

The means for causing this complete flow comprises a supplementary or secondary conduit by which a portion of the fluid may be conducted from one end of the conduit to the other, past all of the branches or connections leading into the various tanks. Preferably this supplementary or secondary conduit is placed within the main conduit and consists primarily of a pipe of smaller diameter than that from which the main conduit is constructed, this pipe extending uninterruptedly past all of the branches in the main conduit.

In Fig. 10 such a construction is shown by way of example as being applied to the inlet conduit 37, though it should be understood that the same construction is used also for the outlet conduit. The supplementary conduit or pipe of smaller diameter is indicated at 110 and is supported in spaced relation to the walls of the conduit 37, as is clearly shown in the cross-sectional view, Fig. 11. The means for supporting the conduit 110 within the conduit 37 may comprise flanges 111 fixed to the conduit 110, these flanges having portions adapted to bear against the inner walls of the conduit 37. Portions of the flanges 111 are cut away as at 112 so that these flanges will not cut off the flow of fluid through the annular space between the supplementary conduit and the main conduit 37. If, now, fluid be caused to flow through the branch 38 which is second from the right, as viewed in Fig. 10, the flow will be in the direction of the arrows in this figure. Part of the fluid coming in from the left will pass through the cut-out portions 112 in the flanges 111 at the left hand end of the pipe 110, and will flow along the annular space between the two pipes and thus into the desired branch 38. Another part of the fluid will enter the left hand open end of the inner pipe or supplementary conduit 110 and will flow therethrough. Since this pipe extends continuously past all of the branches to the end of the conduit 37, the fluid flowing through the pipes will flow entirely to the end of the conduit and will then turn back upon itself and enter the annular space between the conduit 37 and the supplementary conduit 110, flowing leftwardly through this annular space to the selected branch 38. Thus it will be seen that when fluid is caused to flow through any one of the branches 38, a flow throughout the entire length of the conduit 37 will be produced, and no dead ends will be left. It is apparent also that fluid flowing out of any selected branch will flow in both directions toward this branch in the conduit 37.

A supplementary conduit of the same sort is used also in the discharge conduit 70, the supplementary conduit being labelled 114 in Figs. 3, 4 and 5. In the case of the discharge conduit, the flow will be exactly the reverse of that pointed out above. Fluid flowing from any of the branches 80 into the conduit 70 will flow in both directions away from the branch. That part of the fluid which flows leftwardly from the branch will pass through the annular space between the conduit 70 and the supplementary conduit 114, and will thus find its way leftwardly into the conduits 71 and 72 and to the ultimate discharge point. That portion of the fluid which flows rightwardly from the branch 80 will pass through the annular space to the right hand end of the conduit, and will then turn upon itself, entering the open end of the supplementary conduit 114 and flowing through it leftwardly to the left hand end of this conduit 114, where it will mingle with the first part of the fluid and find its way into the conduits 71 and 72 and to the discharge point.

When supplementary conduits as above described are used, the main conduits 37 and 70 are still provided with quickly detachable joints, as above described, but before these conduits may be disassembled it is necessary to remove the supplementary conduits from them. This may be accomplished easily and quickly by unscrewing the caps 115 which close the ends of the conduits 37 and 70 and by then withdrawing the supplementary conduits 110 and 114 longitudinally from the main conduits. The spacing members 111, being fixed to the supplementary conduits, are withdrawn with them. When these supplementary conduits have been removed, the various sections of the main conduits may then be detached from each other as has been described above.

After the parts have been cleaned and sterilized, the main conduits 37 and 70 are first reassembled, and then the supplementary conduits 110 and 114, with their spacing members 111 attached, are reinserted longitudinally in the main conduits, and the caps 115 are replaced.

It has been mentioned above that the inflow and discharge of fluid was effected by applying a partial vacuum or a pressure to the selected tank. The means for accomplishing this will now be described.

Mounted on suitable supports 130 is a platform 131, and above this platform and supported therefrom by means such as the legs 132 is a frame 133 to which is attached the body or casing 134 of a plug valve, the plug 135 of which is rotatably mounted in a tapered seat in this casing 134. This valve plug 135 has a tubular extension 136 extending upwardly therefrom, and a second tubular extension 137 extending downwardly. Each of these tubular portions are in alinement with the axis of rotation of the valve plug. A pipe 138 is connected to a tubular extension 136 by a suitable fluid tight joint 139 which allows the valve plug to rotate relative to the pipe. This pipe 138 is connected to a suitable source of pressure (not shown) such as a compressed air tank or an air compressor or a tank of compressed or treated gas of any kind. Another pipe 140 is connected to the tubular extension 137, this connection also being by a joint 141 which is fluid tight although allowing relative rotaton between the pipe 140 and the tubular portion 137. This pipe 140 may be spoken of as a vacuum line, and is connected to a vacuum pump or vacuum tank or other suitable receptacle having a pressure less than that of the atmosphere.

The valve plug 135 contains two main ports 146 and 147, the former communicating with the upper tubular extension 136 and the latter with the lower tubular extension 137. Thus the port 146 is in communication with the pressure supply line 138, while the port 147 is connected to the vacuum line 140. These two ports are arranged, in the present instance, approximately 90° apart, as shown in Figs. 18, 20, 21 and 22. It will be observed from Figs. 20 and 21 that the vacuum port 147 has an enlargement 148 at one side thereof, so that the effective width of this port is somewhat greater than that of the port 146. The valve casing 134, in the present instance, is provided with four ports 150, as shown in Fig. 21. The number of these ports corresponds to the number of tanks 31. If a greater or less number of tanks were used, the number of ports in the valve casing 134 would be correspondingly increased or diminished, and the angle between the plug ports 146 and 147 would likewise be changed. In the present instance, the four ports 150 are spaced at intervals of 90° around the casing, and as the plug ports 146 and 147 are likewise spaced 90° from each other, it follows that the vacuum port 147 will be in communication with one of the ports 150 at the same time that the pressure port 146 is in communication with another one of the ports 150.

A pipe 151 leads from each of the ports 150 in the valve casing 134 to one of the tanks 31, as is shown most clearly in Fig. 2. Each of these pipes 151 enters the top of its tank, as shown especially in Figs. 13 and 14. It will be seen that an upstanding annular flange 152 is provided on each tank, this flange being similar to the flange 81 through which the outlet pipe 80 passes, but at the opposite end of the tank. A sleeve 153 is held within this annular flange by a nut 154, and packing 155 is provided between the sleeve and the tank to form a fluid tight joint. The pipe 151 is connected to the upper end of the sleeve 153 by a nut 156 which may be disconnected easily by hand when it is desired to disassemble the parts for cleaning.

The lower end of the sleeve 153 has a tapered valve seat 157 formed therein, this seat being adapted to cooperate with a tapered portion 158 on a valve member 159 which has a cage-like extension 160 formed on the top thereof. This cage-like extension slides within the sleeve 153 and forms a guiding means for the valve 159, alining it properly at all times so that it will be correctly seated when it is forced upwardly.

The lower end of the valve 159 is shaped to conform to the upper end of a float 161 which is slidable up and down in a guideway formed by the cage 162. The valve 159 is fixed to the top of the float 161 by means such as the screw 163. It is obvious that when the pipe 151 leading to any selected tank is in communication with the vacuum port 147 of the control valve, the selected tank will be connected to the vacuum line and the pressure within the tank will be less than that of the atmosphere and, therefore, less than the pressure within the conduit 37 and branch 38. Therefore, liquid will be drawn into the tank 31 through the branch 38 and the inlet check valve 55. During this filling operation, the float 161 and its valve 159 will be in their lowermost position shown in Fig. 13, the restricted lower end of the guiding cage 162 supporting the float 161 and preventing further downward movement thereof.

When the liquid being drawn into the tank reaches the float 161, this float will obviously be raised to the position shown in Fig. 14. Such raising of the float will force the valve 159 into contact with its seat 157 and will thus close the end of the sleeve 153 which is, in effect, the end of the pipe 151. This closing of the float valve will cut off communication between the pipe 151 and the interior of the tank 31, thus disconnecting the interior of the tank from the vacuum line. As soon as the liquid coming into the tank has reached a state of equilibrium, reducing the vacuum in the tank to a point just sufficient to retain the liquid therein, further entrance of liquid will cease.

From this it will be seen that two separate means are provided for disconnecting the tank 31 from the vacuum line 140. The first means consists of the control valve 134, 135, the plug of which may be turned to bring the vacuum port 147 out of registration with the port 150 corresponding to any selected one of the tanks. The second disconnecting means comprises the float valve 159. It is apparent that this second disconnecting means controls the maximum amount of liquid which can enter the tank, and after the liquid level has reached a predetermined point, entrance of further liquid will be prevented by the float valve in spite of the fact that the control valve 134, 135 may still remain in such a position that the tank is connected to the vacuum line.

In the present apparatus, steam is introduced into the holding tanks 31, as will be described hereafter. A certain amount of steam vapor may thus be drawn into the conduits 151 and the vacuum line. In order to remove the condensate resulting from this steam, there is provided in the present instance a catch-all or condensate trap 165, shown in Figs. 16, 17 and 19. This condensate trap is connected at 166 to the vacuum line 140, and serves to catch all or substantially all of the condensate finding its way into the vacuum line during operation of the apparatus. The connection 166 between the condensate trap and the vacuum line comprises a nut of such size and shape that it may be readily unscrewed by hand without the aid of tools, and thus the condensate trap may be removed easily as frequently as may be necessary in order to empty or clean it.

The pressure and vacuum ports 146 and 147 in the control valve have been described above. In addition to these ports, there are three smaller ports which are open to the atmosphere. One of these, designated as 170, in Fig. 21, is located between the vacuum and pressure ports, so that it comes into registration with the port 150 in the valve casing while the valve plug is turning to remove the pressure port 146 from this port 150 and to bring the vacuum port 147 into registry therewith. This port 170 extends up to the top of the valve plug 135 and is there open to the atmosphere. This allows the escape of the pressure within the tank and returns the tank substantially to atmospheric pressure before connecting it to the vacuum line. This arrangement avoids placing a useless burden on the vacuum pump by making it evacuate a tank in which the initial pressure is above that of the atmosphere.

Two other venting ports 171 and 172 are also provided, as shown in Fig. 21. These are arranged, in the present instance, 90° from each other, and are so positioned that when the vacuum port 147 and the pressure port 146 are in registration with two of the ports 150, the venting ports 171 and 172 will be in registration with the other two ports 150, thus keeping the two tanks connected to these last two ports at atmospheric pressure.

From the mechanism so far described, it is apparent that a control valve is provided which, upon rotation, is adapted to connect the various tanks successively with the pressure line and the vacuum line. This control valve could, of course, be turned by hand, and the apparatus would function properly if this turning were accomplished at the proper time. Preferably, however, automatic power means is provided for operating the control valve according to a predetermined schedule. This means will now be described.

On the platform 131, mentioned above, is mounted a power element such as the electric motor 175, shown in Fig. 16. The armature shaft 176 of this motor drives a shaft 177 of a reduction gear box 178. Through a train of reducing gears (not shown) within this box, the shaft 177 drives a vertical shaft 179, shown in Figs. 17 and 19. This shaft 179, through a coupling 180, drives a shaft 181 which extends upwardly through a portion of the frame 133 which supports the control valve, and at the upper end of this shaft there is fixed a Geneva driving disk 182. This disk is adapted to drive a gear 183 fixed to the rotatable valve plug 135, this gear forming the other member of the Geneva driving train.

The construction of the Geneva disk 182 and the gear 183 is best shown by reference to Fig. 16. Four tanks are illustrated in the present embodiment of the invention, and the control valve therefore has four positions. The gear 183, therefore, is provided with four dwell or locking portions 184 at intervals of 90° around the periphery of the gear, each of these dwell portions being of concave shape and arranged to ride upon the smooth periphery of the driving disk 182 while the latter rotates, thus locking the gear 183 and preventing rotation thereof.

Between the locking portions or dwells 184, the gear 183 is provided with gear teeth 185, which are arranged to mesh with gear teeth 186 formed on a portion of the periphery of the driving disk 182. The rest of the periphery of the disk 182 is smooth, as appears clearly from Fig. 16.

Assuming that the parts are initially in the position shown in Fig. 16, if the driving disk 182 be rotated in the direction of the arrow 187, it is apparent that the gear 183 will remain stationary until the driving disk 182 has rotated approximately three-quarters of a revolution. At this time, the first of the gear teeth 186 on the driving disk will abut against the right hand side of the dwell portion 184 on the gear 183 and will push leftwardly against this dwell portion. At this time, the dwell portion is sufficiently freed from the periphery of the disk 182 so that it may move, and the gear 183 then begins to rotate in the direction of the arrow 188. This rotation continues through a quarter of a revolution until the next dwell or locking portion 184 comes into position to engage the periphery of the locking disk 182. At this time, the gear teeth 186 on the locking disk have completed their action on the gear teeth 185 and become completely disengaged therefrom. The disk 182 then continues its rotation, the smooth periphery thereof engaging the locking portion 184 of the gear 183 and holding this gear stationary until the disk 182 has again completed approximately three quarters of a revolution, when the same operation above described will be repeated.

Thus it is seen that intermittent gearing is provided for moving the control valve step by step from one of its positions to the next position. This intermittent or Geneva gearing is arranged so that the control valve is moved one quarter of a revolution for each complete revolution of the driving disk 182. Four revolutions of the driving disk are necessary to turn the control valve through one complete revolution, this revolution of the control valve corresponding to one complete cycle of operation of the entire apparatus, and including an emptying and filling operation in each of the four holding tanks, or a total of four emptying and four filling operations, during the normal operation of the device, after all the tanks have once been filled.

The rate of rotation of the driving disk 182 may be varied, of course, to suit the requirements of the particular process or treatment being performed in this apparatus. When used for the pasteurization of milk, a holding period of about thirty minutes is ordinarily desired. Under these circumstances, the speed reduction gearing within the gear box 178 is so designed with reference to the speed of the motor 175 that the shaft 181, carrying the driving disk 182, will be given one complete rotation every fifteen minutes. This will produce a quarter of a revolution of the control valve every fifteen minutes, or a complete revolution in one hour. With the parts moving in this manner, it is seen that fifteen minutes is allowed for emptying each tank, then approximately fifteen minutes for filling it with a fresh supply of liquid, and this liquid then is held undisturbed in the tank for a period of approximately half an hour, when it is then discharged and replaced by another fresh charge.

When this apparatus is used for holding milk, or for carrying out any other process in which the liquid is to be held within the tanks at a temperature above that of the atmosphere, it is desirable to provide means for heating the space within the tank above the liquid level. It is found in practice that if such heating means is not provided a layer of liquid at the top, and especially such froth and bubbles as may be present on the top of the liquid, tends to cool off and thus does not become properly treated.

Means is therefore provided in this apparatus for heating the space above the liquid level in each tank, this means being illustrated in Figs. 23 to 26, inclusive. In one end of each tank, near the top, there is an outwardly extending annular flange 200 in which a sleeve 201 is secured by a nut 202. The sleeve 201 carries an inwardly extending shoulder 203, against which a plate 204 is held by a ring 205 screwed into interior threads formed on the sleeve 201. Suitable packing is inserted between the shoulder 203 and the plate 204, and also between the plate and the ring 205, so that a fluid tight joint is produced.

A conduit 206 passes through an opening in the plate 204, and is secured therein by welding or in any other suitable manner, so that the conduit is held rigidly in fixed position relative to the plate. It will be noted that the conduit is slightly inclined to a horizontal plane, the end of the conduit within the tank being somewhat above the outer end.

Each end of the conduit 206 is closed by a cap 207 held in place by a nut 208. Near the inner end of the conduit, and substantially at the top thereof, several small openings 209 are formed, the combined area of all of these openings being much less than the cross-sectional area of the conduit, so that these openings may be described as "restricted".

On the lower side of the conduit near the outer end thereof is a drainage connection 210, to which is attached piping 211 leading past a valve 212 to a check valve 213, this check valve being arranged to allow fluid to flow through it in a direction away from the conduit 206, but to prevent flow in the opposite direction, or toward the conduit 206. The piping 211 continues beyond the check valve 213 and leads to an enlarged section of conduit forming a chamber 214, and from the bottom of this chamber there is a pipe 215 leading to a steam trap 216, and extending thence to any convenient discharge point. The steam trap 216 is arranged to allow the condensation water to flow in a direction away from the chamber 214 past the trap, but to prevent flow of steam therethrough.

On the upper side of the conduit 206, near the outer end thereof but at a point slightly inwardly from the drainage connection 210, is a steam supply connection 219, which is connected by piping 220 to a steam supply line 221, which preferably extends along past all of the tanks 31 and supplies the conduit 206 in each tank with steam.

In heating the interior of the tank 31 by this mechanism above described, it is preferable to use steam vapor at a comparatively low pressure. In fact, good results are obtained when the steam is supplied at a pressure only enough greater than that of the atmosphere to cause it to flow readily through the pipes and conduits. Under these conditions, it is found that there is practically no condensation within the tank, although the interior of the tank is kept sufficiently warm so that the surface layer of liquid and the bubbles and froth thereon are properly treated. Any steam condensing within the conduit 206 flows to the outer end of the conduit, because of the inclination thereof, and thence escapes by way of the drain connection 210 and the piping 211. The restricted openings 209, by which steam escapes from the conduit 206 into the interior of the tank, are a substantial distance above the bottom of the conduit, and therefore any condensate within the conduit is below these openings and cannot drip through them into the tank.

In addition to the above described means for heating the space within each tank above the liquid level, other means may be provided for warming the whole interior of each tank, prior to the commencement of the day's operation. It is apparent that if the process be started when the tanks are comparatively cold, a considerable amount of heat from the first supply of liquid drawn into each tank will be consumed in warming the tank.

To avoid this, it is desirable to preheat the holding tanks whenever operation is resumed after having been shut down long enough to allow the tanks to cool off. The preheating means may consist, for example, of a steam conduit 230 extending across all of the tanks 31, slightly above them, as shown in Fig. 2. This conduit has a branch 231 leading to each tank, each branch including a T-shaped fitting 232, as shown in Fig. 13. At the top of the fitting 232 is a blow-off cock 233, and a pipe 234 leads from the bottom of the T fitting 232 to an upward extension 235 on the conduit 151, in alinement with the passageway from this conduit into the interior of the tank through the sleeve 153 and the float control valve 159. A valve 236 is arranged in each of the of the branches 231 leading from the steam conduit 230 to the tanks.

When it is desired to heat the tanks at the commencement of the operation, the valves 236 may be opened to allow steam to flow from the conduit 230 through the branches 231 and into the tanks. At this time, the tanks will be emptied of liquid and the float valves 159 will, therefore, be open, so that they will not interfere with the passage of steam into the tanks. The tanks are thus warmed to the desired temperature, and the cocks 233 may be opened to blow out the tanks, if desired, these cocks also serving to permit the escape of steam when the heating operation is finished, so that the pressure within the tank may be returned to that of the atmosphere before the liquid treating process is commenced.

It is very desirable to provide means for observing conditions within the tanks while the process is being carried on. To permit this observation, each tank may be provided with one or more observation windows or peep holes, as shown in Fig. 1. The detailed construction of each peep hole is illustrated in Fig. 27, from which it is seen that an annular outwardly extending flange 240 has a sleeve 241 mounted therein and held in place by a nut 242, the inner end of the sleeve being of greater diameter than the inner diameter of the flange 240, as shown clearly in the drawings. An inwardly projecting shoulder 244 on each sleeve 241 may serve as an abutment for holding one side of a glass plate 245, a ring 246 being screwed against the other side of the plate. Suitable packing is provided on each side of the glass plate.

Preferably two of these peep holes are provided in each tank, one being used for observation purposes while illuminating means is arranged to shine through the other to illuminate the interior of the tank. This illuminating means, as shown in Fig. 27, may consist of an electric light bulb 250 mounted in a socket 251 and supplied with current through a cord 252, the socket 251 having a reflector 253 which has a flange 254 extending radially outward at its large end. This flange 254 is of approximately the same diameter as the outer end of the sleeve 241 on each peep hole, and, therefore, it may be clamped easily against the end of the sleeve by means of a nut 255.

With the illuminating means in position at the left hand peep hole, as shown in Fig. 27, observation of conditions within the tank may be carried on through the right hand peep hole. When liquid vapor has condensed on the glass of the right hand peep hole to such an extent as to intefere with visibility therethrough, the illuminating unit may then be detached easily from the left hand peep hole by unscrewing the nut 255 a few turns, and it may be transferred to the right hand peep hole and attached thereto. Observation may then be carried on through the left hand peep hole, while the light from the illuminating unit will shine through the right hand peep hole to a sufficient extent to illuminate the interior of the tank for the purpose desired. It is found in practice that the heat from the electric bulb will gradually heat the glass 245 of the peep hole to which it is attached and will cause the vaporization of the liquid vapor which has condensed thereon, thus clearing the glass. By the time the left hand peep hole has become clouded with condensed vapor, the right hand hole will be cleared, and the illuminating unit may then be transferred from the right hand peep hole back to the left hand hole so that observation may be carried on through the right hand peep hole while the left hand one is being cleared.

If desired, each tank may be provided with means for agitating the contents thereof. This means may consist, for example, of the propeller 260 as shown in Fig. 4, the propeller being mounted on a shaft 261 extending through the wall of the tank and being driven by suitable means such as a belt (not shown) cooperating with a pulley 262.

Each of the tanks is provided, of course, with lagging or an insulating covering 265, as shown in Figs. 3 and 4. This insulating material may consist, for example, of a cork composition, or of any other suitable material, and may be covered throughout by a sheath or covering 266, which may be of metal or of any other desired construction. The insulating composition prevents rapid cooling on the contents of the tank and keeps the liquid at the proper temperature for carrying out the process.

Having now described the detailed construction of the apparatus, a brief description of the operation thereof will be given as an aid to a more complete understanding of the invention.

Prior to the commencement of the actual liquid treating process, the tanks are warmed or preheated by opening the valves 236 and allowing steam from the conduit 230 to enter each tank. When the tanks have been warmed to the desired extent, the valves 236 may be closed and the steam remaining within each tank may be blown out through the cocks 233.

The tanks now being ready for the reception of liquid, the motor 175 which drives the control valve 134, 135 may be started, it being assumed that the conduit 138 is supplied with gas under pressure and that the conduit 140 carries a partial vacuum.

The milk or other liquid to be treated is heated to the desired temperature in the heater (not shown) and flows thence into the tank 34 through the conduit 33. The supply of heated liquid within the tank 34 is substantially at atmospheric pressure, since the lid 35 is not intended to be air tight.

Assuming now that the control valve is initially in the position shown in Fig. 21, it will be seen that the pressure port 146 is connected to the conduit 151 which leads to the first tank, this being the tank marked A in Figs. 1 and 2. Since there is no liquid within the tank at this time, there is nothing to be expelled by the pressure, and no movement of liquid takes place in this tank.

At the same time, it will be noted that the vacuum port 147 of the control valve is connected to the conduit 151 which leads to the extreme right hand tank, which is marked D in Figs. 1 and 2. A partial vacuum is, therefore, created within this tank. The discharge check valve 89 remains closed under the influence of this vacuum, while the inlet check valve 55 at the bottom of tank D opens, and liquid is drawn into the tank D from the supply tank 34 through the conduits 36 and 37. The valve 39 is adjusted to throttle down the flow of liquid through the conduits to the desired rate.

The control valve 134, 135 remains in the position shown in Fig. 21 for approximately fifteen minutes, at the end of which time the Geneva gear mechanism 182, 183 turns it a quarter of a revolution in a counter clockwise direction. The vacuum port 147, on account of its enlargement 148, remains in communication with the port 150 for a substantial time after the valve plug has commenced to rotate, and thus the tank remains connected with the vacuum line somewhat longer than the period during which it is connected to the pressure line 138. This is desirable because sometimes a greater length of time is needed to fill a tank than to empty it, since the maximum available difference in pressure for filling the tanks is approximately fifteen pounds per square inch (atmospheric pressure) while much higher pressure can be used if desired for emptying the tanks.

During the time that the vacuum port 147 was connected to the tank D, the liquid flowing thereinto may have filled the tank to the maximum liquid level shown in Fig. 4, in which case the float valve 159 would operate to disconnect the tank from the vacuum line and to prevent the entrance of any substantial additional amount of liquid; or on the other hand, the regulating valve 39 may have been throttled down to such an extent that the liquid had not reached the level necessary to close the float valve up to the time that the control valve 135 was turned to disconnect the tank from the vacuum line. Thus it is seen that the regulating valve 39 provides a means for limiting the amount of liquid flowing into a tank, and by proper manipulation of this valve the apparatus may be set so that the tanks are only partially filled during each filling cycle, instead of being fully filled to the point where the float valve 159 would operate.

When the plug 135 of the control valve has rotated a quarter of a revolution from the position shown in Fig. 21, the pressure port 146 will be in communication with the tank B, while the vacuum port 147 will be connected to tank A. At the same time, the venting port 172, which is open to the atmosphere, will communicate with tank D which has just been filled, and will equalize the pressure within this tank with that of the atmosphere. During the rotation of the valve plug, the venting port 170 has been in communication with tank A for a moment and has thus relieved the pressure previously built up within this tank so that the tank is substantially at atmospheric pressure at the time that the vacuum port 147 is connected thereto.

With the control valve in the position just described, which may be termed its second position, no liquid movement will take place in tank B which is connected to the pressure line, since this tank as yet contains no liquid. Tank A, however, is now connected to the vacuum line, and liquid will be drawn into this tank from the conduit 37 in the manner described above in connection with tank D. The control valve will remain in this position for approximately fifteen minutes. Whether the tank A is filled completely or only partially with liquid during this time will depend on the position in which the regulating valve 39 has been set, as was pointed out above. During all of this fifteen minute interval, the liquid which has been drawn into the tank D during the previous fifteen minute interval is being held in this tank, remaining substantially at the temperature to which it was raised before entering the tank. The agitator 260 may be operated to agitate the liquid if desired, and low pressure steam may be supplied through the conduit 221 to the heating units 206 to warm the space within the tank above the liquid level.

At this end of this second period of approximately fifteen minutes, the valve plug 135 is moved another quarter of a revolution in a counter-clockwise direction to its third position which brings the pressure port 146 into communication with tank C, and the vacuum port 147 into communication with tank B. The venting ports 171 and 172 are then connected to tanks D and A respectively. Tank B is then filled or partially filled with liquid during this third interval of approximately fifteen minutes, while the liquid within tanks A and D remains held within these tanks. At the end of this third period, it is apparent that the liquid within tank D will have been held therein for two periods, or approximately thirty minutes, while the liquid within tank A will have been held therein for approximately fifteen minutes.

At the end of this third period, the valve plug 135 once more moves counter-clockwise through a quarter of a revolution to its fourth position, in which the pressure port 146 is connected to tank D, the vacuum port 147 to tank C and the venting ports 171 and 172 to tanks A and B. The connection of the vacuum port 147 to tank C draws liquid into this tank in the manner above described. Meanwhile, the pressure line 138, connected to the tank D through port 146, creates a fluid pressure within conduit 151 which presses down against the top of the float valve 159 and opens this valve if it is closed, and puts the space within the tank above the liquid under pressure. The pressure acting down against the top of the liquid causes the liquid to flow upwardly through the discharge pipe 80, opening and passing through the check valve 89, and flowing into the discharge conduit 70, from which it is taken by conduits 71 and 72 to the cooler or to any other desired point. Meanwhile, the readings of the recording thermometers 73 and 74 show the temperatures of inflow and outflow.

At the conclusion of this fourth period of approximately fifteen minutes, the tank D will be emptied, the tank C will have had a supply of liquid drawn into it, the tank B will contain liquid which has been held therein for approximately fifteen minutes, and the tank A will contain liquid which it has held for approximately thirty minutes.

The control valve 135 now turns once more, which brings it back to the position illustrated in Fig. 21. The pressure port 146, now connected with tank A, causes the discharge of the liquid within this tank, while the connection of the vacuum port 147 with tank D causes a fresh supply of liquid to be drawn into this tank which has just been emptied during the last period.

The next rotation of the control valve through a quarter of a revolution will fill tank A and empty tank B, the next will fill tank B and empty tank C, and so on. It is thus apparent that one tank is always being emptied, another tank is always being filled and two tanks are always holding the liquid previously drawn thereinto. The operation is continuous except for the slight interval necessary to turn the control valve from one of its positions to the next position. Therefore, except during this slight interval, liquid is always flowing through the conduits 36 and 37 into one of the tanks, and liquid is always being discharged through the conduits 70, 71 and 72 from one of the tanks. The special construction of the supply and discharge conduits with the supplementary conduits inside them insures complete flow through the entire length of both of the conduits at all times, and thus liquid does not stagnate in dead end pockets, as it might do if such a construction were not provided.

During the entire operation, or during such portions thereof as may be desired, the space within each tank is heated by low pressure steam supplied through the heating units 206 or by any other heating means which may be provided. The conditions within each tank may be observed from time to time as desired, through the peep holes 245, the illuminating units being moved back and forth from one peep hole to another as may be necessary in order to clear up condensation on the inside of the glass.

At the end of the day's operation, or at any intermediate time desired, the conduits may be disconnected easily, on account of the quickly detachable nature of their joints and connections, and they as well as the various valves, fittings, and other parts may be thoroughly cleaned and sterilized. This is especially important where delicate chemical processes are being carried out, or where the material being treated is intended for human consumption.

It will now be seen that an efficient and satisfactory apparatus has been provided, which is applicable particularly to the pasteurization of milk, but which may be used also for carrying out various other processes dealing with various materials.

It is obvious that the number and arrangement of the holding tanks could be varied at will, and that they could be connected so that two or more tanks were being filled concomitantly, instead of one at a time, as in the illustrative embodiment shown.

While one embodiment of the invention has been disclosed, it is to be understood that the inventive idea may be carried out in a number of ways. This application is, therefore, not to be limited to the precise details shown, but is intended to cover all variations and modifications thereof falling within the spirit of the invention or the scope of the appended claims.

We claim as our invention:

1. In an apparatus for treating liquids, the combination with a plurality of tanks, of a conduit connected to a source of liquid supply, a branch leading from said conduit to each of said tanks, means for causing liquid to flow from said conduit into a selected tank through the branch corresponding thereto, and means for causing liquid within said conduit to flow toward said branch from each side thereof.

2. In an apparatus for treating liquids, the combination with a plurality of tanks, of a conduit connected to a source of liquid supply, a branch leading from said conduit to each of said tanks, means for causing liquid to flow from said conduit into a selected tank, and means for supplying liquid to the end of said conduit farthest from said source of liquid supply so that the liquid within said conduit will flow therethrough in both directions toward the branch leading to said selected tank.

3. In an apparatus for treating liquids, the combination with a plurality of tanks, of a conduit connected to a source of liquid supply, a branch leading from said conduit to each of said tanks, means for causing liquid to flow from said conduit into a selected tank through the branch corresponding thereto, and a supplementary conduit connected at one end to said first named conduit between the source of liquid supply and the branch nearest thereto, and connected at its other end to said first named conduit at a point past the branch farthest from said source of liquid supply, so that when liquid is caused to flow from said conduit into any one of said tanks it will create a flow throughout substantially the entire length of said conduit.

4. In an apparatus for treating liquids, the combination with a plurality of tanks, of a conduit, a branch leading from said conduit to each of said tanks, and a supplementary conduit within said first named conduit extending continuously past all of said branches and connected at each end to said first named conduit, so that when liquid is caused to flow through any one of said branches it will create a flow through substantially the entire length of said conduit.

5. In an apparatus for treating liquids, the combination with a plurality of liquid holding tanks, of a liquid conduit, a branch connecting said liquid conduit with each of said tanks, and a secondary conduit within said first named conduit extending uninterruptedly past all of said branches and connected at each end to said first named conduit, said secondary conduit being supported in spaced relation to the walls of said first named conduit.

6. In an apparatus for treating liquids, the combination with a plurality of liquid holding tanks, of a liquid conduit, a branch connecting said liquid conduit with each of said tanks, a secondary conduit within said first named conduit extending continuously past the branches thereof and operatively connected at each end to said first named conduit, and supporting members carried by said secondary conduit for supporting the same within said first named conduit in spaced relation to the walls thereof.

7. In an apparatus for treating liquids, the combination with a plurality of liquid holding tanks, of a liquid conduit, a branch connecting said liquid conduit with each of said tanks, a secondary conduit within said first named conduit extending past said branches and operatively connected adjacent each end to said first named conduit, and means for supporting said secondary conduit in spaced relation to the walls of said first named conduit, said supporting means permitting the flow of liquid through said first named conduit in the space outside of said secondary conduit.

8. In a milk pasteurizer holding apparatus, the combination with a plurality of liquid holding tanks, of a milk conduit, a branch connecting said milk conduit to each of said tanks, a secondary conduit within said first named conduit extending continuously past all of said branches, and supporting members attached to said secondary conduit for supporting the same in spaced relation to the walls of said first named conduit, said supporting members each comprising a flange surrounding said secondary conduit, portions of said flange being adapted to bear against the walls of said first named conduit and other portions of said flange being cut away to allow flow of liquid through said conduit past said flange.

9. In an apparatus for treating liquids, the combination with a plurality of liquid holding tanks, of a liquid conduit, a branch connecting said liquid conduit with each of said tanks, and a secondary conduit within said first named conduit extending a substantial distance in each direction from said branch, said secondary conduit being removable from said first named conduit and said first named conduit being constructed of members having quickly detachable joints so that the parts may be disassembled and reassembled easily by hand for purposes of cleaning and sterilization.

10. In an apparatus for treating liquids, the combination with a plurality of liquid holding tanks, of a liquid conduit, a branch connecting said conduit with each of said tanks, portions of said conduit between said branches being joined to the portions of said conduit adjacent said branches by quickly detachable joints, and a secondary conduit within said first named conduit extending continuously past said branches and through said intervening removable portions, said parts being arranged so that they may be disassembled easily and quickly by hand for purposes of cleaning and sterilization, by withdrawing said secondary conduit longitudinally from said first named conduit and then detaching the joints of said first named conduit.

11. In an apparatus for treating liquids, the combination with a liquid holding tank, of means for connecting said tank to a source of liquid supply, a vacuum line, means including a pipe for connecting said tank to said vacuum line, a valve seat associated with said pipe, a valve adapted in one position to bear against said valve seat to close said pipe and in another position to be out of contact with said valve seat to establish communication between said tank and said pipe, said valve having a cage-like guiding portion extending into said pipe when said valve is in either of said positions, a float, said valve having a portion shaped to conform to the shape of a portion of said float and adapted to rest thereon, and means for securing said valve to said float, so that when the liquid within said tank reaches a predetermined level said float will be moved to close said valve to cut off communication between said tank and said vacuum line.

12. In an apparatus for treating liquids, the combination with a plurality of liquid holding tanks, of means for filling and emptying said tanks, said means including a filling and emptying control valve comprising a valve casing having a tapered opening therein, a plurality of ports in said casing, means connecting each of said tanks to one of said ports, a tapered valve plug rotatably mounted within the opening in said valve casing, a passageway in said valve plug operatively connected to a source of fluid pressure, and a second passageway in said valve plug operatively connected to a vacuum line, said passageways being so arranged that they will register successively with said ports when said valve plug and said valve casing are rotated relatively to each other, the end of said second passageway cooperating with said ports being wider than the corresponding end of the first passageway, so that said second passageway will remain connected to one of said ports for a longer time than said first passageway during the relative rotation of the valve plug and casing.

13. In an apparatus for treating liquids, the combination with a liquid holding tank, of a liquid conduit connected thereto, a check valve in said conduit for permitting movement of liquid therethrough in one direction and preventing movement in the opposite direction, said check valve including a movable disk, and a screen member attached to said disk and moving therewith, said screen member being so positioned that all liquid passing through said check valve must first pass through said screen member.

14. In a milk pasteurizer holding apparatus, a liquid holding tank, means for filling and emptying said tank, said means including a plurality of conduits having openings in alinement with each other, and a check valve associated with the opening in one of said conduits, said check valve being so positioned that when it is moved to permit flow of liquid through the opening with which it is associated it tends to prevent flow through another opening.

15. In an apparatus for treating liquids, the combination with a conduit having an open end, of a second conduit in alinement with said first conduit and having an open end spaced from the open end of the first conduit, a seat for a check valve associated with the open end of the first conduit, and a check valve arranged to cooperate with said seat, said check valve being movable back and forth from a position in which it closes the end of the first conduit to a position in which it opens said first conduit and tends to prevent flow into the end of said second conduit.

16. In a milk pasteurizer holding apparatus, the combination with a conduit having a check valve seat associated therewith, of a check valve arranged to move into and out of contact with said seat, said check valve having a guiding portion movable within said conduit, and a screen member secured to said guiding portion and so arranged that all fluid flowing in said conduit past said check valve must pass through said screen member.

17. In an apparatus for treating liquid, the combination with a liquid holding tank, of a well portion adjacent the bottom of said tank, an inlet conduit connected to the bottom of said well, a second conduit extending upwardly from said well and having its lower end positioned therein, and a check valve associated with the inlet conduit, said check valve normally preventing flow of fluid from said well into said inlet conduit while allowing flow into said second conduit, said check valve being movable to a position permitting flow from said inlet conduit into said well and tending to prevent flow from said inlet conduit into said second conduit.

18. In an apparatus for treating liquids, the combination with a liquid holding tank, of a well portion adjacent the bottom of said tank, a conduit connected to the bottom of said well, a second conduit extending upwardly from said well and having its lower end positioned therein, a check valve associated with said first conduit, said check valve normally preventing flow of fluid from said well into said first conduit while allowing flow into said second conduit, a check valve associated with the second conduit, a screen member in said second conduit for straining fluid flowing from said well into said second conduit before said fluid reaches the check valve associated with the second conduit, and a screen member for straining fluid flowing from said first conduit into said well.

19. In a milk pasteurizer holding apparatus, the combination with a liquid holding tank, of a liquid conduit operatively connected thereto, a portion of said conduit being detachably secured to said tank by quickly operable securing means, and a check valve mounted in the detachable portion of said conduit and freely removable longitudinally from the open end of said conduit when the latter is detached, whereby said conduit may be easily detached from said tank to permit cleaning and sterilizing both said conduit and said check valve.

20. In a milk pasteurizer holding apparatus, the combination with a liquid holding tank having a well portion adjacent the bottom thereof, of a liquid conduit extending upwardly from said well portion and having its lower end positioned therein, and a member removably mounted within said well portion, said member serving to guide the end of said conduit and to center it within said well portion.

21. In a milk pasteurizer holding apparatus, the combination with a liquid holding tank having a well portion adjacent the bottom thereof, of a liquid conduit extending upwardly from said well portion and having its lower end positioned therein, a member removably mounted within said well portion, said member serving to guide the end of said conduit and to center it within said well portion, and a screen member carried by said centering and guiding member for cooperation with said conduit.

OTTO I. CHORMANN.
JENS N. JACOBSEN.